(12) United States Patent
Kim et al.

(10) Patent No.: US 12,511,053 B2
(45) Date of Patent: Dec. 30, 2025

(54) MEMORY SYSTEM WITH HOT PAGE LOGIC, AN ELECTRONIC SYSTEM INCLUDING THE SAME MEMORY SYSTEM AND A METHOD OF OPERATING THE SAME ELECTRONIC SYSTEM

(71) Applicant: Samsung Electronics Co., Ltd., Suwon-si (KR)

(72) Inventors: Dohyun Kim, Suwon-si (KR); Eui-young Chung, Suwon-si (KR); Seong Jun Yun, Suwon-si (KR); Jinwoo Choi, Suwon-si (KR); Yeri Heo, Suwon-si (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/588,434

(22) Filed: Feb. 27, 2024

(65) Prior Publication Data
US 2025/0053304 A1    Feb. 13, 2025

(30) Foreign Application Priority Data
Aug. 7, 2023    (KR) .......................... 10-2023-0102914

(51) Int. Cl.
*G06F 3/06* (2006.01)
(52) U.S. Cl.
CPC .......... *G06F 3/0614* (2013.01); *G06F 3/0647* (2013.01); *G06F 3/0673* (2013.01)
(58) Field of Classification Search
CPC ....................................................... G06F 3/06
See application file for complete search history.

(56) References Cited

U.S. PATENT DOCUMENTS

| | | | |
|---|---|---|---|
| 10,733,110 B1 * | 8/2020 | Volpe | G06F 3/0656 |
| 2022/0317925 A1 | 10/2022 | Lepak | |
| 2022/0382478 A1 | 12/2022 | Park et al. | |
| 2023/0004302 A1 | 1/2023 | Reza et al. | |
| 2023/0017824 A1 | 1/2023 | Park et al. | |
| 2023/0044342 A1 | 2/2023 | Wilkinson | |
| 2023/0064745 A1 * | 3/2023 | Dirik | G06F 12/0246 |
| 2023/0092541 A1 | 3/2023 | Dugast et al. | |
| 2023/0093247 A1 | 3/2023 | Kumar et al. | |
| 2023/0127449 A1 * | 4/2023 | Kim | G06F 3/0604 |
| | | | 711/154 |
| 2024/0095179 A1 * | 3/2024 | Niu | G06F 3/067 |
| 2024/0404480 A1 * | 12/2024 | Hsiao | G02B 6/0091 |
| 2025/0123749 A1 * | 4/2025 | Singh | G06F 3/0649 |

FOREIGN PATENT DOCUMENTS

| | | |
|---|---|---|
| CN | 115904212 A | 4/2023 |
| KR | 20210125948 A | 10/2021 |
| WO | 2022198552 A1 | 9/2022 |

* cited by examiner

*Primary Examiner* — Khoa D Doan
(74) *Attorney, Agent, or Firm* — Wolf, Greenfield & Sacks, P.C.

(57) ABSTRACT

A memory system and an electronic system including the same are provided. The memory system includes a memory device configured to receive data, and a hot page logic configured to receive an address for the data, determine that the address is for a hot page based on an input frequency and an input order of the address, and create hot page information including the address that was determined as associated with the hot page such that a page migration operation of the data is performed.

17 Claims, 16 Drawing Sheets

MEMORY SYSTEM WITH HOT PAGE LOGIC, AN ELECTRONIC SYSTEM INCLUDING THE SAME MEMORY SYSTEM AND A METHOD OF OPERATING THE SAME ELECTRONIC SYSTEM

CROSS-REFERENCE TO RELATED APPLICATION

This application claims priority to and the benefit of Korean Patent Application No. 10-2023-0102914 filed in the Korean Intellectual Property Office on Aug. 7, 2023, the entire contents of which are incorporated herein by reference.

BACKGROUND

The present disclosure relates to a memory system, an electronic system including the same, and a method of operating the electronic system.

As the amount of data to be processed by electronic devices increases, a high-capacity memory system capable of high-speed processing is required. To meet this demand, a heterogeneous memory system is being used in consideration of memory operation efficiency and cost.

Different types of memories can be classified as a tiered memory system due to differences in memory access request processing speed and capacity. In order to process memory access requests more efficiently, it is important to increase access to faster memories in terms of performance for data that is processed with high frequency, and to increase access to slower memories in terms of performance for data that is processed with relatively low frequency.

SUMMARY OF THE INVENTION

A memory system in which the overhead of an operating system is reduced in controlling data access in a tiered memory system is provided.

A memory system with increased reliability of data access control is provided.

An electronic system including a high-capacity heterogeneous memory system capable of high-speed processing is provided.

According to some embodiments, a memory system is provided that includes a memory device configured to receive data, and a hot page logic configured to receive an address for the data, configured to determine that the address is for a hot page based on an input frequency and an input order of the address, and create hot page information including the address that was determined as associated with the hot page such that a page migration operation of the data is performed.

According to some embodiments, an electronic system is provided that includes a processor configured to output data and an address of the data, a first memory system including a first memory device configured to receive the data and a hot page logic configured to receive the address and configured to output hot page information based on an input frequency and an input order of the address, and a second memory system including a second memory device different from the first memory device. A page migration operation for the data is performed based on the hot page information.

According to some embodiments, a method of operating an electronic system is provided that includes collecting frequency data and recency data of an address in a first memory system based on an input frequency and an input order of the address for a first data that is input to the first memory system, measuring a first data bandwidth of the first data and a second data bandwidth of a second data that is input to a second memory system different from the first memory system, performing a calculation operation on the frequency data and the recency data in response to a ratio of the first data bandwidth and the second data bandwidth, creating hot page information indicating whether the address is a hot page based on the calculation operation, and migrating a page for the first data based on the hot page information.

DETAILED DESCRIPTION

Figure 1:
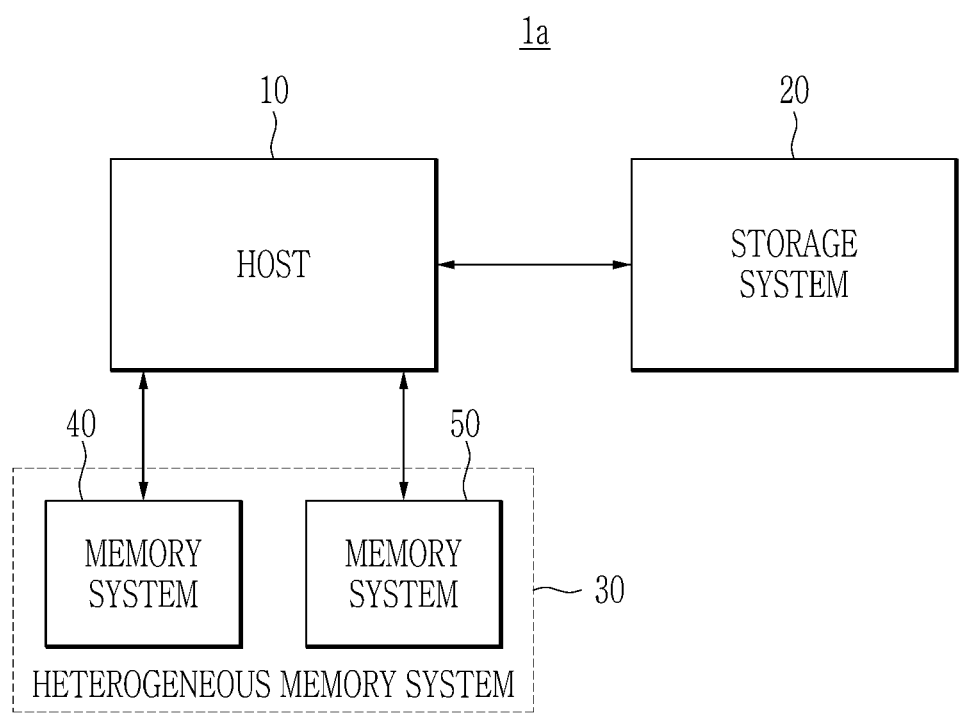
FIG. 1 is a block diagram showing the configuration of an electronic system according to some embodiments.

Hereinafter, the present disclosure will be described in detail hereinafter with reference to the accompanying drawings, in which embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Size and thickness of each constituent element in the drawings are arbitrarily illustrated for better understanding and ease of description, the following embodiments are not limited thereto. In the drawings, the thickness of layers, films, panels, regions, etc., are exaggerated for clarity. In the drawings, the thickness of some layers and regions may be exaggerated for ease of description.

In addition, unless explicitly described to the contrary, the word "comprise", and variations such as "comprises" or "comprising", will be understood to imply the inclusion of stated elements but not the exclusion of any other elements.

Figure 2:
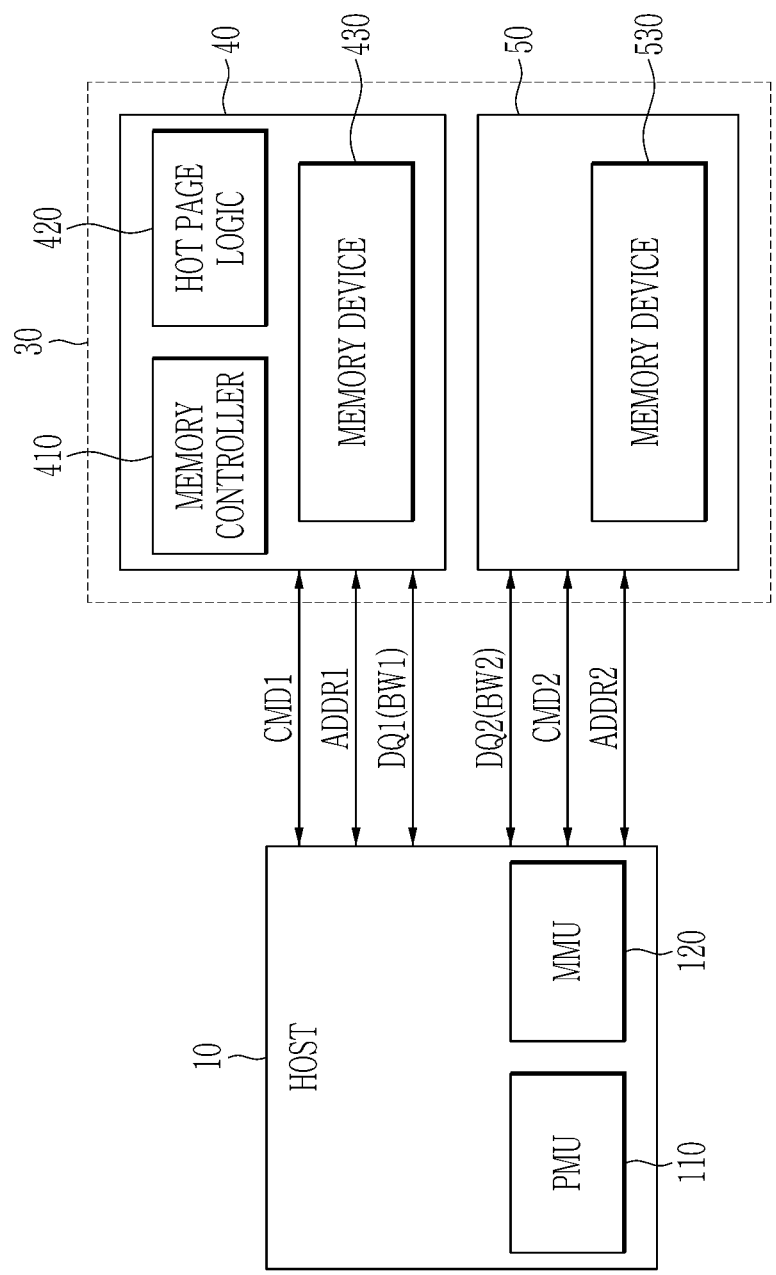
FIGS. 2 and 3 are diagrams for describing an electronic system according to some embodiments.
Figure 3:
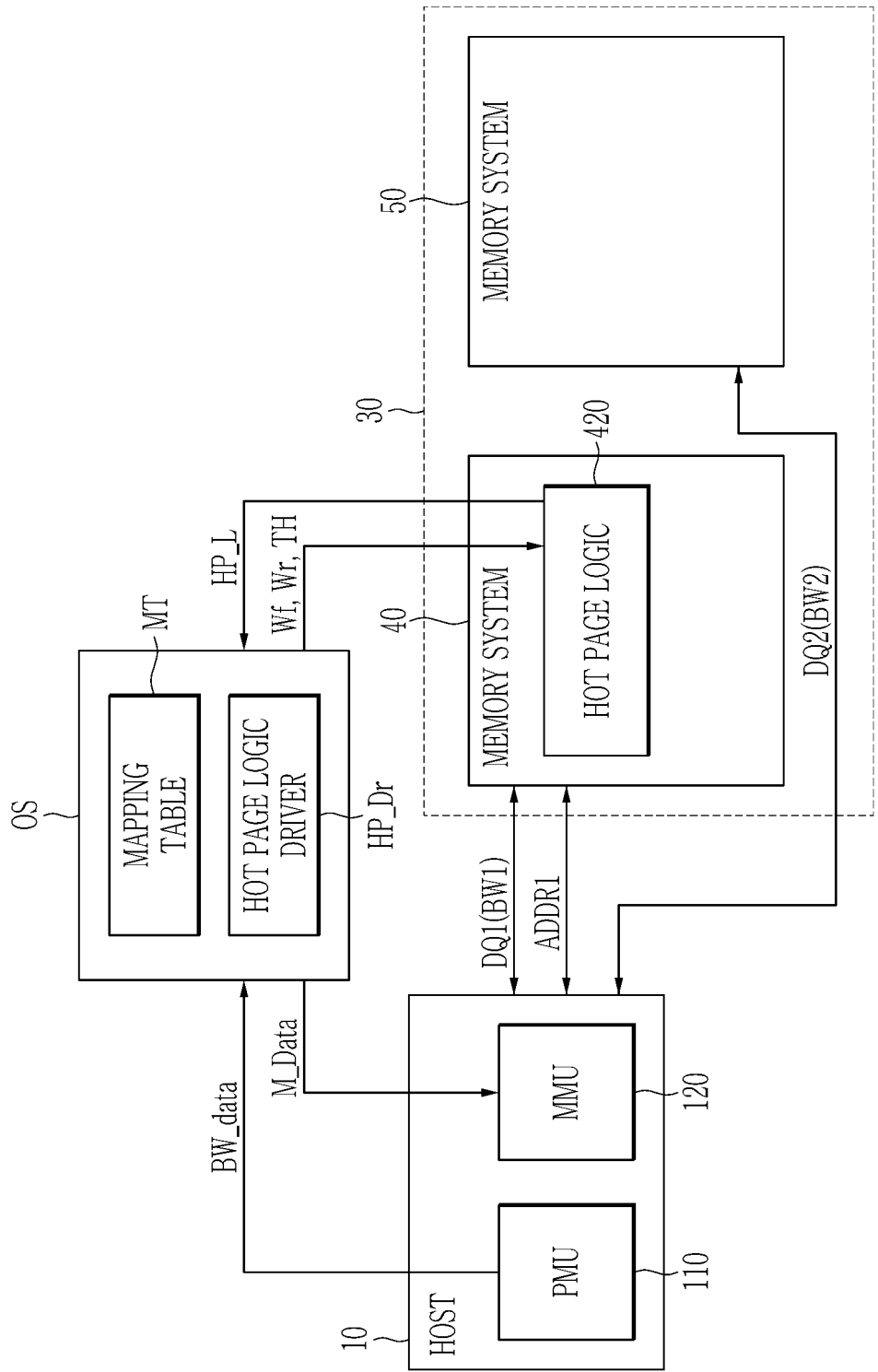

FIG. 1 is a diagram showing the configuration of an electronic system according to some embodiments. FIGS. 2 and 3 are diagrams for describing an electronic system according to some embodiments.

Referring to FIGS. 1 to 3, an electronic system 1a may be configured to run applications such as deep neural networks, learning systems such as Q-learning, or applications such as high-performance computing and/or graphic operations.

These applications cooperate to execute jobs or tasks in parallel, train different data sets, may require calculation and memory capabilities to learn with high accuracy, prioritize power efficiency, and/or short latency time.

The electronic system 1a may be included in user devices such as a personal computer, a laptop computer, a server, a media player, and a digital camera, or in automotive devices such as a navigation device, a black box, and a vehicle electric device. In some embodiments, the electronic system 1a may be a mobile system such as a mobile phone, a smart phone, a tablet personal computer (PC), a wearable device, a healthcare device, or an internet of things (IoT) device.

The electronic system 1a may include a host device 10, a storage system 20 and a heterogeneous memory system 30. The host device 10 is a main component of the electronic system 1a that processes and manages instructions, which may control overall operations of the electronic system 1a. The host device 10 is mainly responsible for executing an operating system (OS) and applications, and the OS may be divided into pages and loaded into the heterogeneous memory system 30. A detailed description of the OS will be described later in the description of FIG. 3.

In some embodiments, the host device 10 may be at least one of processors such as a central processing unit (CPU), graphics processing (GPU), neural processing unit (NPU), and/or data processing unit (DPU). In some embodiments, the host device 10 may include a single-core processor or a multi-core processor.

The host device 10 may include a performance management unit (PMU) 110 and a memory management unit (MMU) 120. The PMU 110 may measure data bandwidth performance of the heterogeneous memory system 30 at regular intervals and provide information on the data bandwidth. For example, the PMU 110 may measure the data bandwidth of the heterogeneous memory system 30 by counting hit or miss operations occurring in the last level cache of the host device 10. However, the measurement operation of the PMU 110 is not limited to the above example.

The PMU 110, according to some embodiments, may measure a first data bandwidth BW1 of a first data DQ1 exchanged between the host device 10 and a first memory system 40 in the heterogeneous memory system 30, and a second data bandwidth BW2 of a second data DQ2 exchanged between the host device 10 and a second memory system 50 in the heterogeneous memory system 30 at regular intervals. In addition, the PMU 110, according to some embodiments may provide bandwidth data BW_data including information on the first data bandwidth BW1 and the second data bandwidth BW2 to the OS.

A memory management unit 120 may receive and store map data M_Data stored in a mapping table MT managed by the OS. According to some embodiments, the memory management unit 120 may manage access to the heterogeneous memory system 30 of the host device 10 and direct memory access within the heterogeneous memory system 30. The access of the host device 10 and the direct memory access may include a read operation for reading data from the heterogeneous memory system 30 and a write operation for storing data in the heterogeneous memory system 30.

Although not shown, according to some embodiments, the host device 10 may include a memory controller. The memory controller may write data to or read data from the memory device under the control of the host device 10 and provide the data to the host device 10. According to some embodiments, the memory controller in the host device 10 may be a memory controller for a second memory device 530, but is not limited thereto.

The storage system 20 may have a relatively longer latency time than the heterogeneous memory system 30. The storage system 20 may include a non-volatile memory device and a non-volatile memory controller for the non-volatile memory device. For example, the non-volatile memory device may include a hard drive, an optical memory, a NAND flash memory, and the like. In some embodiments, the storage system 20 may include non-volatile memory, volatile memory, and combinations or portions thereof, either of which may be referred to as a "storage medium."

In various embodiments, a non-volatile memory device may be configured to store data in a semi-permanent or substantially permanent form.

The heterogeneous memory system 30 may be used as a main memory or system memory of the electronic system 1a. The heterogeneous memory system 30 may be loaded with the OS and application data and may be used as a temporary storage place for the OS and application data, or may be used as an execution space for various software codes.

In the heterogeneous memory system 30, addition/subtraction/multiplication/division calculations, vector operations, address operations, or fast fourier transform (FFT) operations may be performed. Further, in the heterogeneous memory system 30, a function for execution used for inference may be performed. Here, inference may be performed in a deep learning algorithm using an artificial neural network. The deep learning algorithm may include a training step of learning a model through various data and an inference step of recognizing data with the learned model.

The heterogeneous memory system 30 may include the first memory system 40 and the second memory system 50. The first memory system 40 may input/output the first data DQ1 with the first data bandwidth BW1 between the host device 10, and receive a first command signal CMD1 and a first address or first address signal ADDR1 corresponding to the first data DQ1 from the host device 10. The host device 10 may write data to or read data from the first memory system 40 through the first command signal CMD1 and the first address signal ADDR1. The second memory system 50 may input/output the second data DQ2 with the second data bandwidth BW2 between the host device 10, and receive a second command signal CMD2 and a second address or second address signal ADDR2 corresponding to the second data DQ2 from the host device 10. The host device 10 may write data to or read data from the second memory system 50 through the second command signal CMD2 and the second address signal ADDR2.

According to some embodiments, the first address signal ADDR1 and the second address signal ADDR2 may include page frame information, which is a physical address of the first memory device 430 and the second memory device 530, respectively. The first address signal ADDR1 and the second address signal ADDR2 may be input in 32 bits to correspond to a page size of 4 KB, but the technical ideas of the present disclosure are not limited to the above example of the number of input bits. According to some embodiments, the unit of paging may vary, and the number of input bits of the address signal may also vary depending on the page size.

The first memory system 40 and the second memory system 50 may be different from each other, and the first memory system 40 may have a relatively longer latency time than that of the second memory system 50 and may be a lower-level memory system in terms of performance. In some embodiments, the first memory system 40 may be a memory expander for the host device 10, and/or a CXL device, but is not limited thereto.

The first memory system 40 may include a first memory controller 410, a hot page logic 420 and a first memory device 430. Although the first memory controller 410 and the hot page logic 420 are represented as separate components In FIG. 2, according to some embodiments, the first memory controller 410 and the hot page logic 420 may be disposed as a single integrated component or disposed separately.

The first memory controller 410 may write data to or read data from the first memory device 430 according to the input first command signal CMD1 and the first address signal ADDR1, and provide the data to the host device 10.

In the present disclosure, the hot page logic 420 may be hardware logic and may include an intellectual property (IP) circuit designed for implementation of an application specific integrated circuit (ASIC) and/or a field-programmable gate array (FPGA). A detailed description of the configuration included in the hot page logic 420 will be described later in the description of FIGS. 4 and 5.

In the present disclosure, the hot page logic 420 may determine a page frame that is recently input and processed with a high frequency as a hot page, and create hot page information for the page frame determined as a hot page to be migrated to the second memory system 50.

The hot page logic 420 may receive the first address signal ADDR1 input to the first memory controller 410 for a predetermined period and create meta data for the page frame. The meta data may include frequency data, recency data, and hot page information. The frequency data may indicate an input frequency for each page frame of the first address signal ADDR1 input during a predetermined period, and the regency data may represent an input order for each page frame of the first address signal ADDR1 input during a predetermined period.

The hot page logic 420 may receive a frequency weight value coefficient Wf, a recency weight value coefficient Wr, and a threshold value TH from the OS, and perform a calculation operation on the created frequency data and the recency data, the frequency weight value coefficient Wf, the recency weight value coefficient Wr, and the threshold value TH. The hot page logic 420 may create a hot page list HP_L for the first address signal ADDR1 based on the calculation operation and output the hot page list HP_L to the OS. The hot page list HP_L may include hot page information indicating whether a page frame of the first address signal ADDR1 is a hot page.

The first memory device 430 may include a dynamic random access memory (DRAM) device. However, the technical idea of the present disclosure is not limited thereto, the first memory device 430 may include any one of volatile memory devices, such as synchronous DRAM (SDRAM), double data rate SDRAM (DDR SDRAM), low power double data rate SDRAM (LPDDR SDRAM), graphics double data rate SDRAM (GDDR SDRAM), DDR2 SDRAM, DDR3 SDRAM, DDR4 SDRAM, DDR5 SDRAM, and the like. In addition, according to some embodiments, the first memory device 430 may include not only a DRAM device but also a non-volatile memory such as PRAM, SRAM, MRAM, RRAM, FRAM, hybrid RAM, or NAND flash, provided that the reaction speed and voltage conditions are satisfied.

The first memory device 430 may receive the first data DQ1, and perform a read operation or a write operation on the first data DQ1 according to the corresponding first command CMD1 and first address ADDR1.

The second memory system 50 may be an upper layer memory system in terms of performance, having relatively lower latency time than the first memory system 40. The second memory system 50 may be a dual in-line memory module (DIMM) device or a high bandwidth memory (HBM) device, but is not limited thereto.

The second memory system 50 may include the second memory device 530. The second memory device 530 may include a dynamic random access memory (DRAM) device. However, the technical idea of the present disclosure is not limited thereto, the first memory device 430 may include any one of volatile memory devices, such as synchronous DRAM (SDRAM), double data rate SDRAM (DDR SDRAM), low power double data rate SDRAM (LPDDR SDRAM), graphics double data rate SDRAM (GDDR SDRAM), DDR2 SDRAM, DDR3 SDRAM, DDR4 SDRAM, DDR5 SDRAM, and the like. In addition, according to some embodiments, the second memory device 530 may include not only a DRAM device but also a non-volatile memory such as PRAM, SRAM, MRAM, RRAM, FRAM, hybrid RAM, or NAND flash, provided that the reaction speed and voltage conditions are satisfied.

According to some embodiments, the memory controller of the second memory system 50 may be disposed outside or external to the first memory system 40, but the technical idea of the present disclosure is not limited thereto.

As shown in FIG. 3, the OS may internally use mapping table MT and a hot page logic driver HP_Dr. The mapping table MT may be a list including map data M_Data matching between a virtual address, which is a page, and a physical address, which is a page frame.

The OS may perform management of the heterogeneous memory system 30 through the mapping table MT. The hot page logic driver HP_Dr may define and set an interface between the OS and the hot page logic 420.

The OS may receive the bandwidth data BW_data including the first data bandwidth BW1 and the second data bandwidth BW2 from the host device 10.

The OS may control the creating operation of the hot page list HP_L of the first memory system 40 by providing the frequency weight value coefficient Wf, the recency weight value coefficient Wr, and the threshold value TH through the hot page logic driver HP_Dr.

The OS may receive the created hot page list HP_L through the hot page logic driver HP_Dr. The OS may perform a page migration operation based on the hot page list HP_L, and adjust the first data bandwidth BW1 and the second data bandwidth BW2. In the page migration operation, the mapping table MT may be changed based on the hot page list HP_L.

Figure 4:
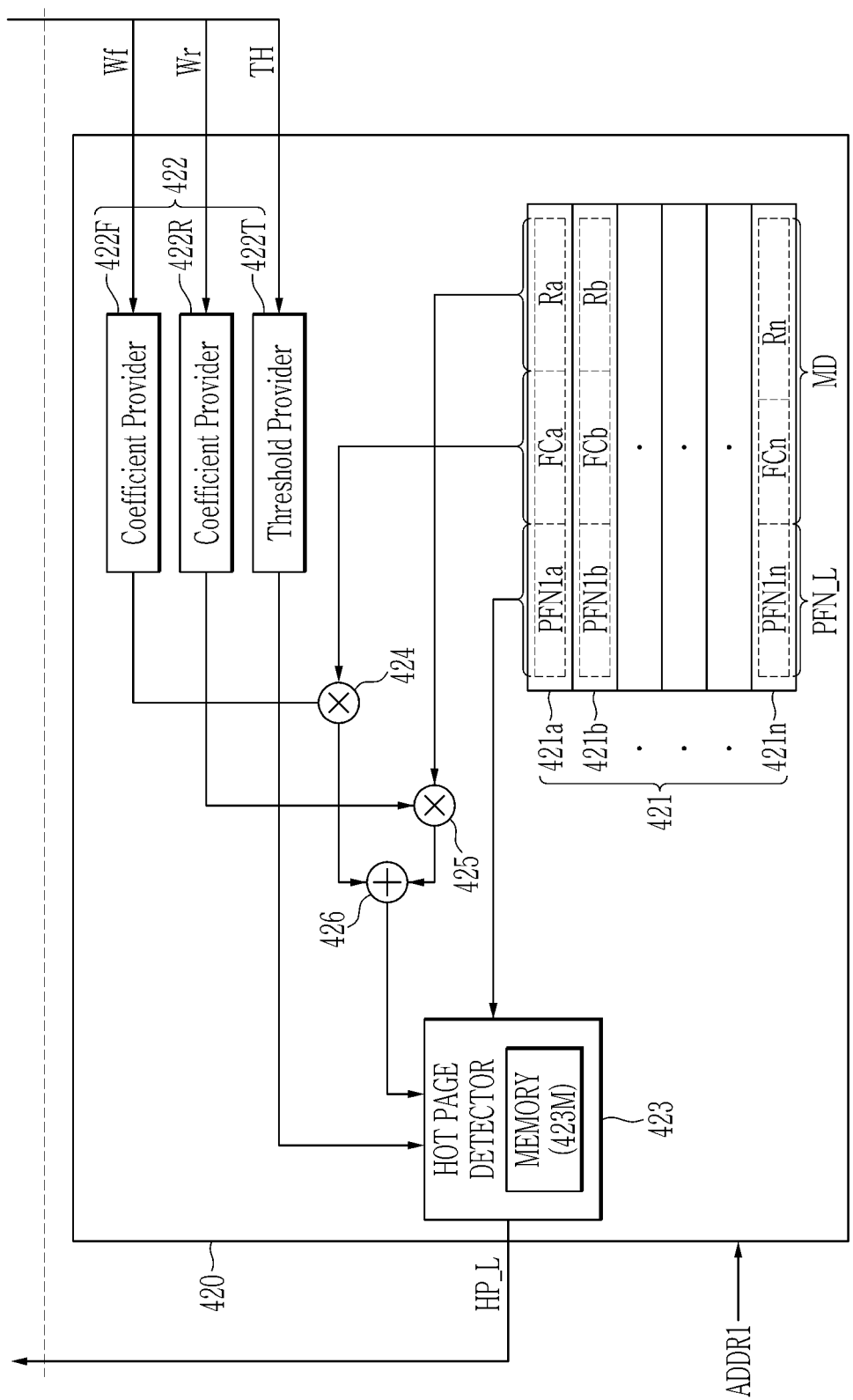
FIG. 4 is a diagram for describing hot page logic according to some embodiments.
Figure 5:
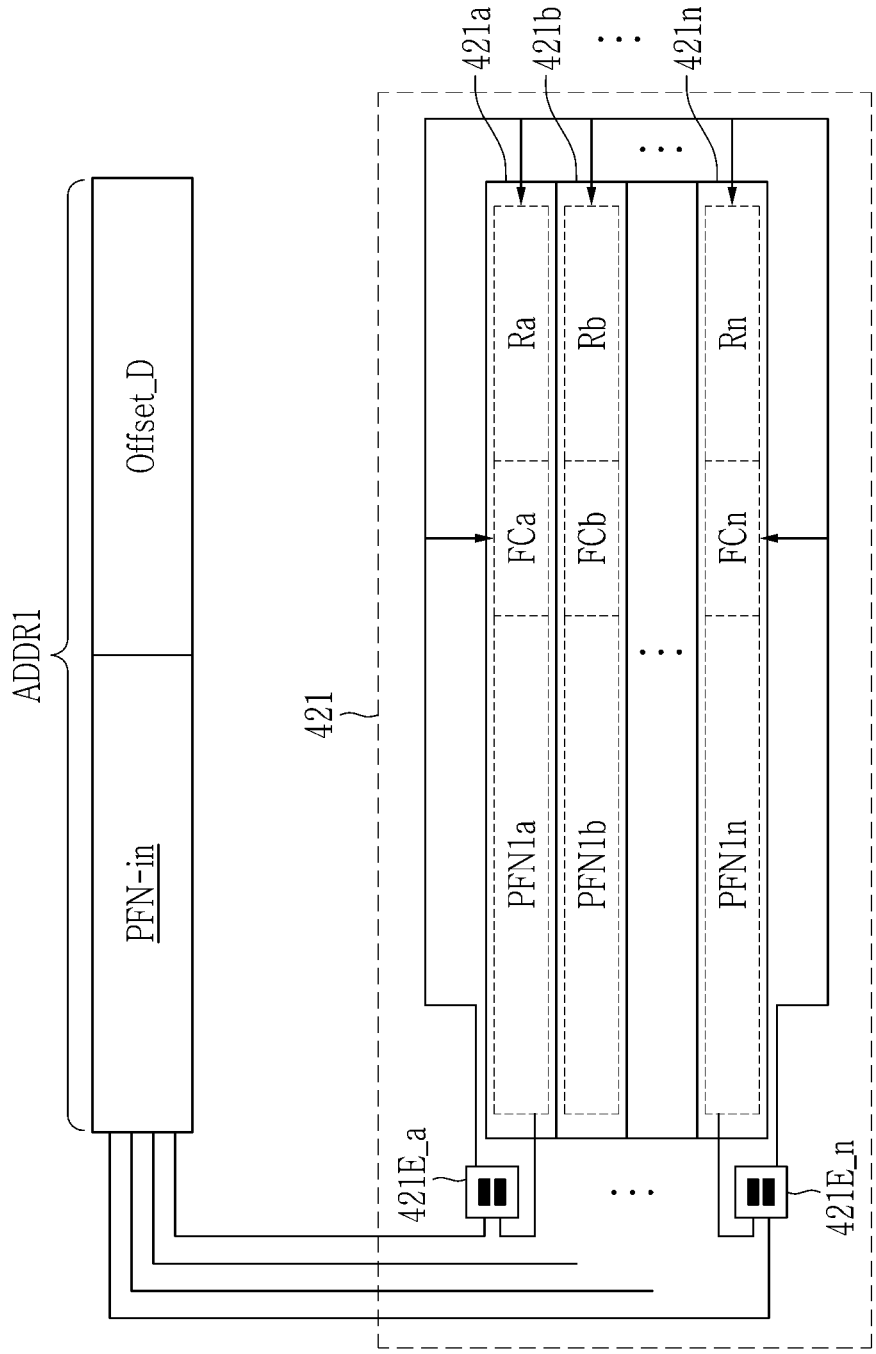
FIG. 5 is a diagram for describing an address table circuit according to some embodiments.

FIG. 4 is a diagram for describing hot page logic according to some embodiments. FIG. 5 is a diagram for describing an address table circuit according to some embodiments.

Referring to FIGS. 4 and 5, the hot page logic 420 may include an address table circuit 421, a setting value provider 422, a hot page detector 423, a first multiplier 424, a second multiplier 425, and an adder 426.

The address table circuit 421 may store a page frame list PFN_L in response to the first address signal ADDR1 input during a predetermined period, and store meta data (MD) corresponding to the page frame list PFN_L. According to some embodiments, the address table circuit 421 may use a least recently used (LRU) replacement policy due to resource limitations in the page frame circuit while storing the page frame list PFN_L and the meta data MD. The LRU replacement policy will be described later in the description of FIGS. 9 and 10.

The address table circuit 421 may include a-th to n-th page frame circuits 421a to 421n and a-th to n-th comparison operators 421E_a to 421E_n. The a-th to n-th page frame circuits 421a to 421n may include a plurality of data registers and may include a latch according to some embodiments, but are not limited thereto.

According to some embodiments, the a-th page frame circuit 421a, like a general-purpose register, may store a first_a page frame number PFN1a, which is a physical address, together with an a-th frequency data FCa and an a-th recency data Ra, which are the meta data MD for the first_a page frame number PFN1a.

The a-th frequency data FCa may indicate an input frequency for the first_a page frame number PFN1a input during a predetermined period, and the a-th recency data Ra may indicate the input order for the first_a page frame number PFN1a input during a predetermined period.

According to some embodiments, as the input frequency of the first_a page frame number PFN1a increases within a predetermined period, the value of the a-th frequency data FCa may increase. In addition, if the input for the first_a page frame number PFN1a of the page frame list PFN_L is more recent than the input for a first_b page frame number PFN1b within the predetermined period, the value of the a-th recency data Ra value may be more than that of a b-th recency data Rb. It is obvious that the description of the a-th page frame circuit 421a can also be applied to the a-th to n-th page frame circuits 421a to 421n.

According to some embodiments, the first address signal ADDR1 may include input page frame number PFN-in and offset data Offset_D. According to some embodiments, offset data Offset_D may include spare data for byte alignment, metadata, or hash values. According to some embodiments, the a-th comparison operator 421E_a may receive the first address signal ADDR1, and may compare an input page frame number PFN-in and the stored first_a page frame number PFN1a in the first address signal ADDR1. According to some embodiments, if the input page frame number PFN-in and the first_a page frame number PFN1a are the same, the a-th comparison operator 421E_a may perform a change operation on the a-th frequency data FCa and a-th to n-th recency data Ra-Rn. For example, the a-th comparison operator 421E_a may increase the value of the a-th frequency data FCa, and change the value of the a-th recency data Ra to the largest value. The a-th comparison operator 421E_a may include a logic operation circuit such as AND, OR, and NOT XOR operator, but is not limited thereto. It is noted that the description of the a-th comparison operator 421E_a can also be applied to the a-th to n-th comparison operators 421E_a to 421E_n.

The setting value provider 422 may receive the frequency weight value coefficient Wf, the recency weight value coefficient Wr, and the threshold value TH from the OS (OS of FIG. 3), and provide the frequency weight value coefficient Wf, the recency weight value coefficient Wr, and the threshold value TH to the first multiplier 424, the second multiplier 425, and the hot page detector 423, respectively. Then, when the frequency weight value coefficient Wf, the recency weight value coefficient Wr, and the threshold value TH are changed and provided to the setting value provider 422 through the OS (OS of FIG. 3), the setting value provider 422 may provide the changed setting value to the first multiplier 424, the second multiplier 425, and the hot page detector 423.

According to some embodiments, the setting value provider 422 may provide setting values for arithmetic and logic operations, and may be a special function register (SFR), but is not limited thereto. The setting value provider 422 may include a frequency weight value coefficient provider 422F, a recency weight value coefficient provider 422R, and a threshold value provider 422T.

The frequency weight value coefficient provider 422F may provide the frequency weight value coefficient Wf to the first multiplier 424. The recency weight value coefficient provider 422R may provide the frequency weight value coefficient Wf to the second multiplier 425. The threshold value provider 422T may provide the threshold value TH to the hot page detector 423.

The first multiplier 424 may receive one of the a-th to n-th frequency data FCa-FCn from the address table circuit 421 and receive the frequency weight value coefficient Wf from the frequency weight value coefficient provider 422F, and perform multiplication operation on one of the a-th to n-th frequency data FCa-FCn and the frequency weight value coefficient Wf. The first multiplier 424 may provide a multiplication operation value to the adder 426.

The second multiplier 425 may receive one of the a-th to n-th recency data Ra-Rn from the address table circuit 421 and receive the frequency weight value coefficient Wf from the recency weight value coefficient provider 422R, and perform multiplication operation on one of the a-th to n-th recency data Ra-Rn and the frequency weight value coefficient Wf. The second multiplier 425 may provide a multiplication operation value to the adder 426.

The adder 426 may perform a summation operation on the multiplication operation value of the first multiplier 424 and the multiplication operation value of the second multiplier 425. The adder 426 may provide the summation value to hot page detector 423.

The hot page detector 423 may receive the page frame list PFN_L from the address table circuit 421. In addition, the hot page detector 423 may receive the summation value of the adder 426 corresponding to one page frame in the page frame list PFN_L and the threshold value TH to compare the two values.

According to some embodiments, the hot page detector 423 may determine whether the first_a to first_n-th page frame numbers PFN1a-PFN1n are hot pages based on whether the first_a to first_n-th page frame numbers PFN1a-PFN1n satisfy Equation 1 below, but is not limited thereto. The hot page detector 423 may create and output the hot page list HP_L for the page frame list PFN_L based on the determination of whether the page is hot or not.

$$TH < Wf \cdot FC + Wr \cdot R \qquad \text{(Equation 1)}$$

In Equation 1, Wf is a frequency weight value coefficient Wf, FC is the value of frequency data for a page frame number (i.e., the frequency or how often that a particular page frame occurs), Wr is the recency weight value coefficient Wr, R is the value of recency data for the page frame number (i.e., how recently that the data at the particular page frame occurred), and TH is the threshold value TH.

In FIG. 4, hot page logic 420 is shown without a separate comparison operator, with the hot page detector 423 performing the comparison operation, but according to some embodiments, the hot page logic 420 may include a comparison operator that is distinct from the hot page detector 423.

According to some embodiments, the hot page detector 423 may include an internal memory 423M. The internal memory 423M may store hot page information for the page frame list PFN_L. The hot page detector 423 may create the hot page list HP_L for the page frame list PFN_L based on the stored hot page information.

Figure 6:
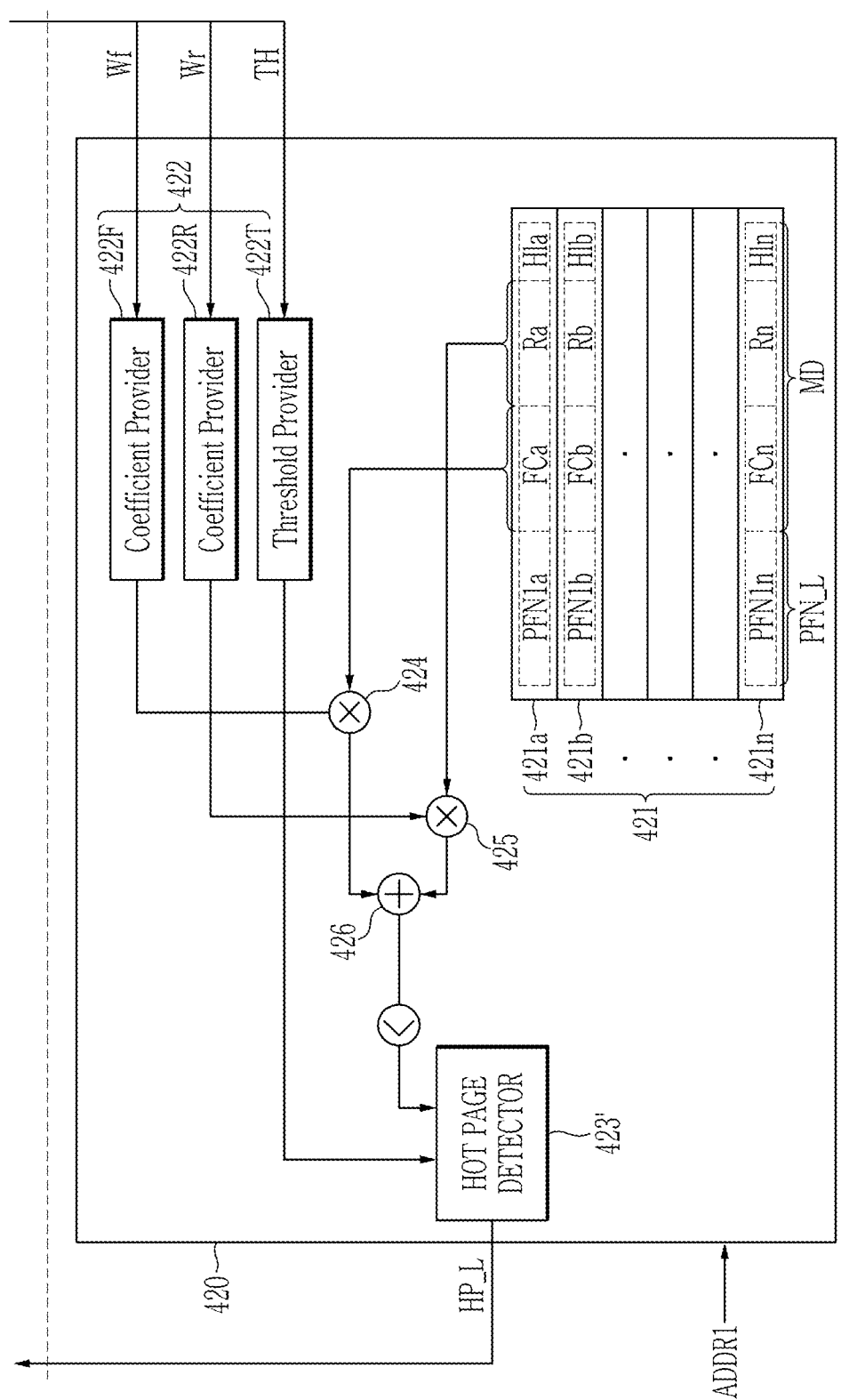
FIG. 6 is a diagram for describing hot page logic according to some embodiments.

FIG. 6 is a diagram for describing hot page logic according to some embodiments.

Referring to FIGS. 4 and 6 together, a hot page logic 420' of FIG. 6 may correspond to the hot page logic 420 of FIG. 4. For convenience of description, detailed descriptions of overlapping constituent elements will be omitted, and the differences between the hot page logic 420' of FIG. 6 and the hot page logic 420 of FIG. 4 will be mainly described.

A hot page detector 423' may compare the summation value of the adder 426 and the threshold value TH as shown in Equation 1 above, and determine whether it is a hot page. The hot page detector 423' may transfer the comparison result information to the address table circuit 421', and hot page information may be written in the address table circuit 421' according to the transfer. The hot page information may indicate whether the corresponding page frame number is a hot page. For example, if the first_a page frame number PFN1a is determined to be a hot page and the first_b page frame number PFN1b is not determined to be a hot page according to the comparison result, the value of the a-th hot page information HIa corresponding the first_a page frame number PFN1a is different from the value of the b-th hot page information HIb corresponding to the first_b page frame number PFN1b.

The address table circuit 421' may store the a-th to n-th hot page information HIa-HIn as the meta data MD for the first_a to first_n-th page frame numbers PFN1a-PFN1a. For example, the a-th hot page information HIa may indicate whether the first_a page frame number PFN1a is a hot page.

The hot page detector 423' may create the hot page list HP_L for the page frame list PFN_L based on the a-th to n-th hot page information HIa-HIn stored in the address table circuit 421'.

In the following description of FIGS. 7 to 12, the operation of the electronic system will be described.

Figure 7:
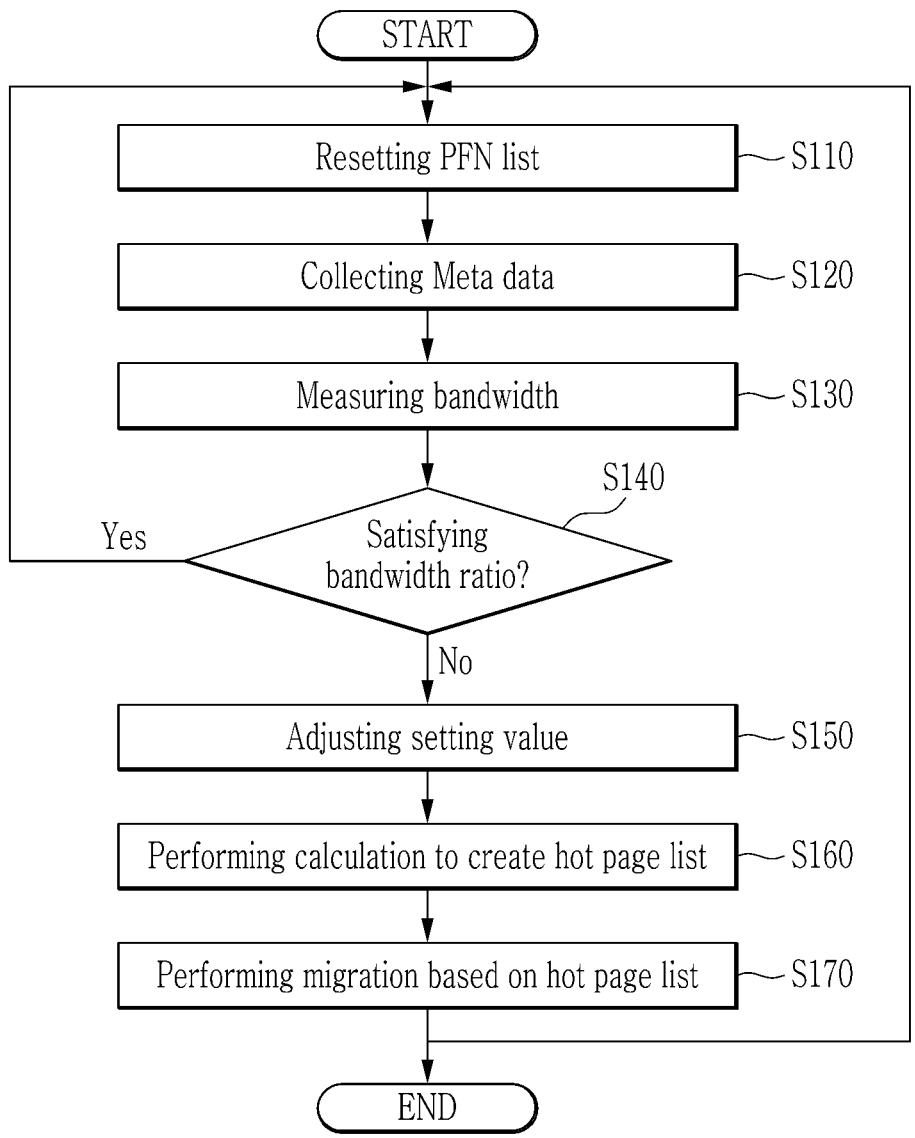
FIG. 7 is a flowchart for describing operations of an electronic system according to some embodiments.
Figure 8:
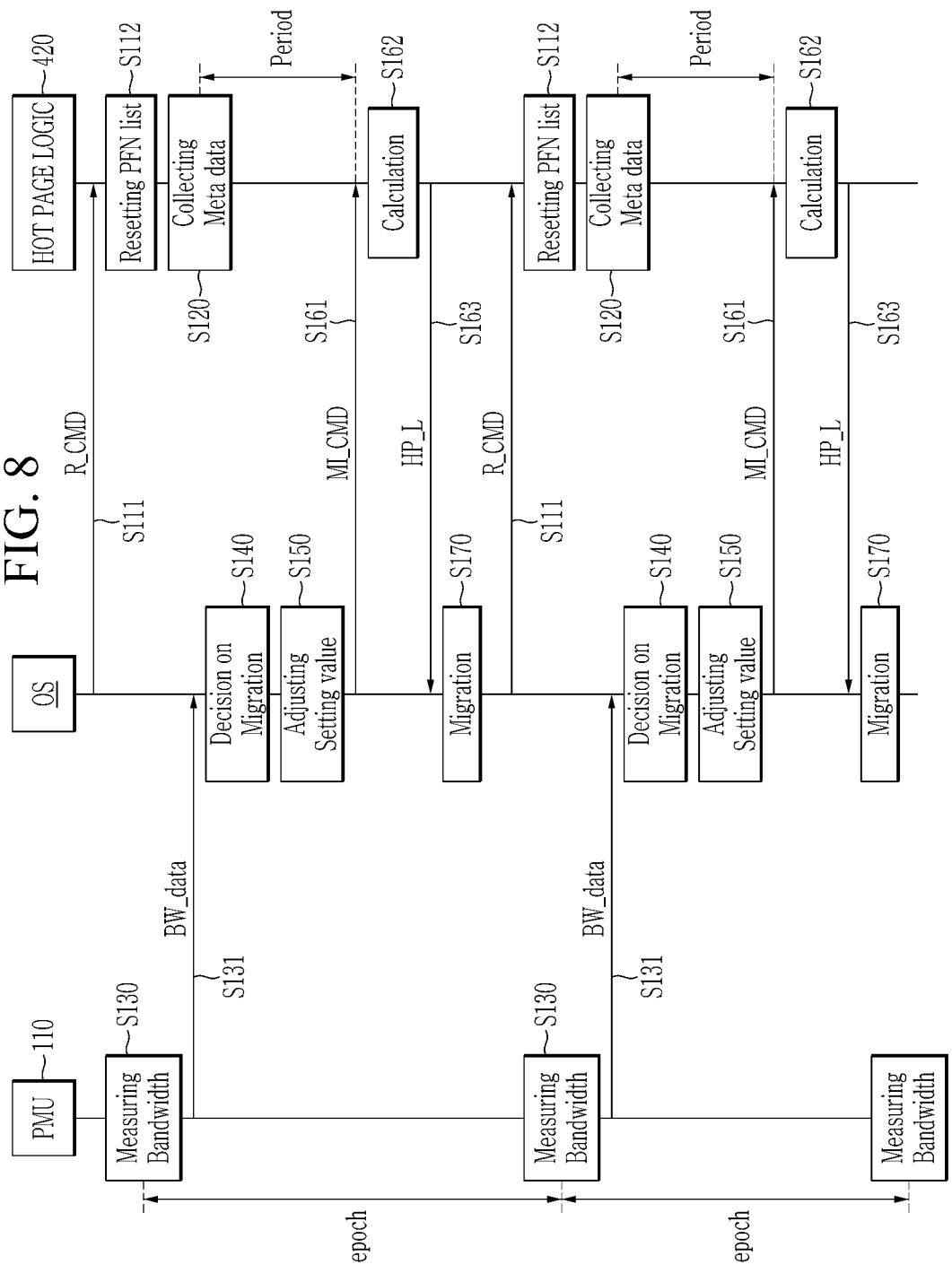
FIG. 8 is a ladder diagram for operating an electronic system according to some embodiments.

FIG. 7 is a flowchart for describing an operation of an electronic system according to some embodiments, and FIG. 8 is a ladder diagram for operating an electronic system according to some embodiments.

Referring to FIGS. 1 to 5, 7 and 8, the electronic system 1a resets the page frame list PFN_L (S110).

The OS provides a reset command R_CMD to the hot page logic 420 (S111). According to some embodiments, the OS may provide a reset command to the hot page logic 420 before measuring bandwidth (S130), which will be described later.

The hot page logic 420 resets the page frame list PFN_L in the address table circuit 421 based on the reset command R_CMD (S112). The hot page logic 420 may delete the page frame list PFN_L from the address table circuit 421 and may also delete the corresponding meta data MD.

After resetting the page frame list PFN_L (S110), the hot page logic 420 collects the meta data MD during a meta data collection period which is a predetermined period (S120). The metadata collection period may be controlled by the OS. According to some embodiments, the meta data collection period may be determined by a pre-stored value.

Figure 9:
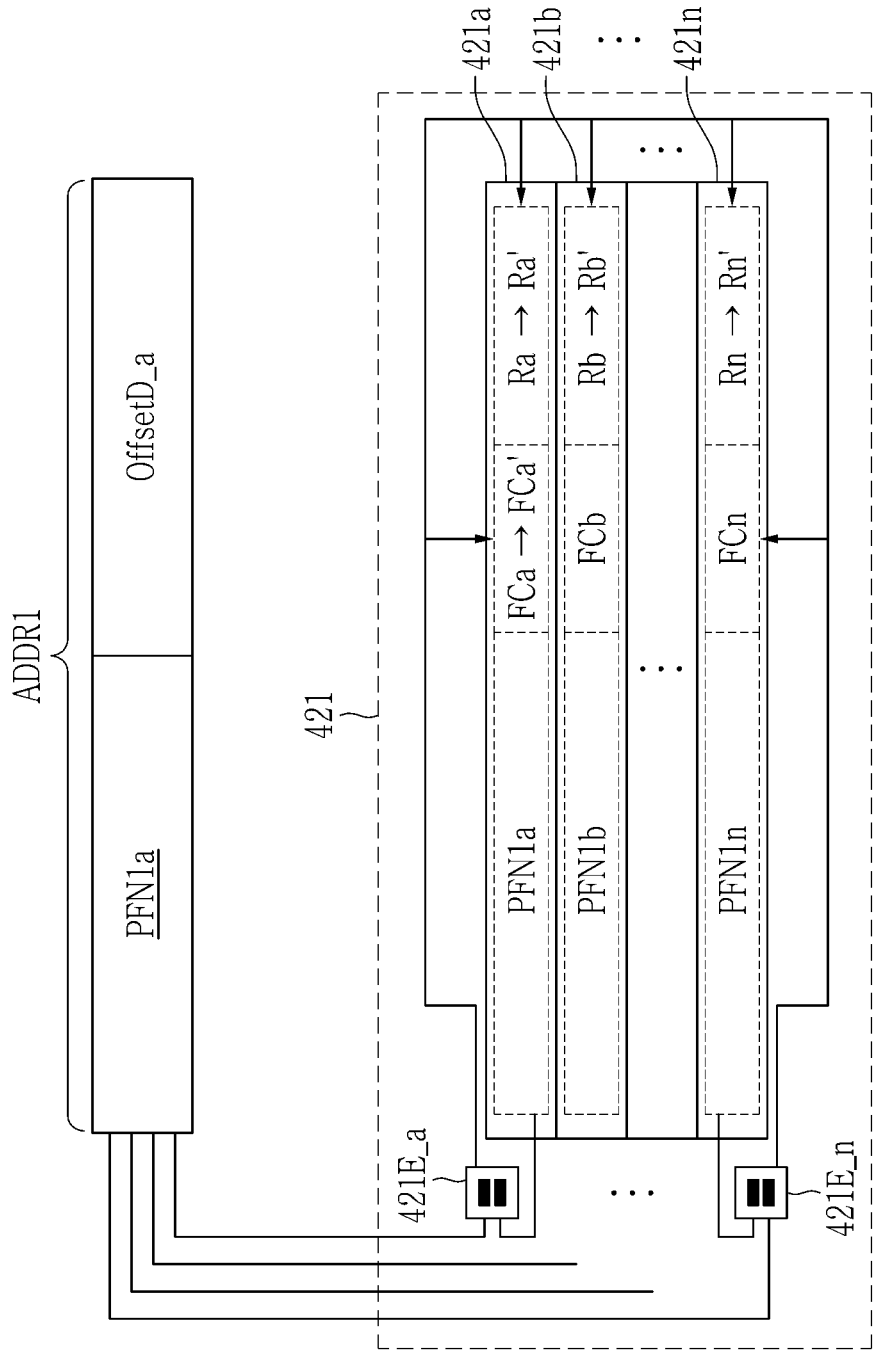
FIGS. 9 to 10 are diagrams for describing operations of a hot page logic according to some embodiments.
Figure 10:
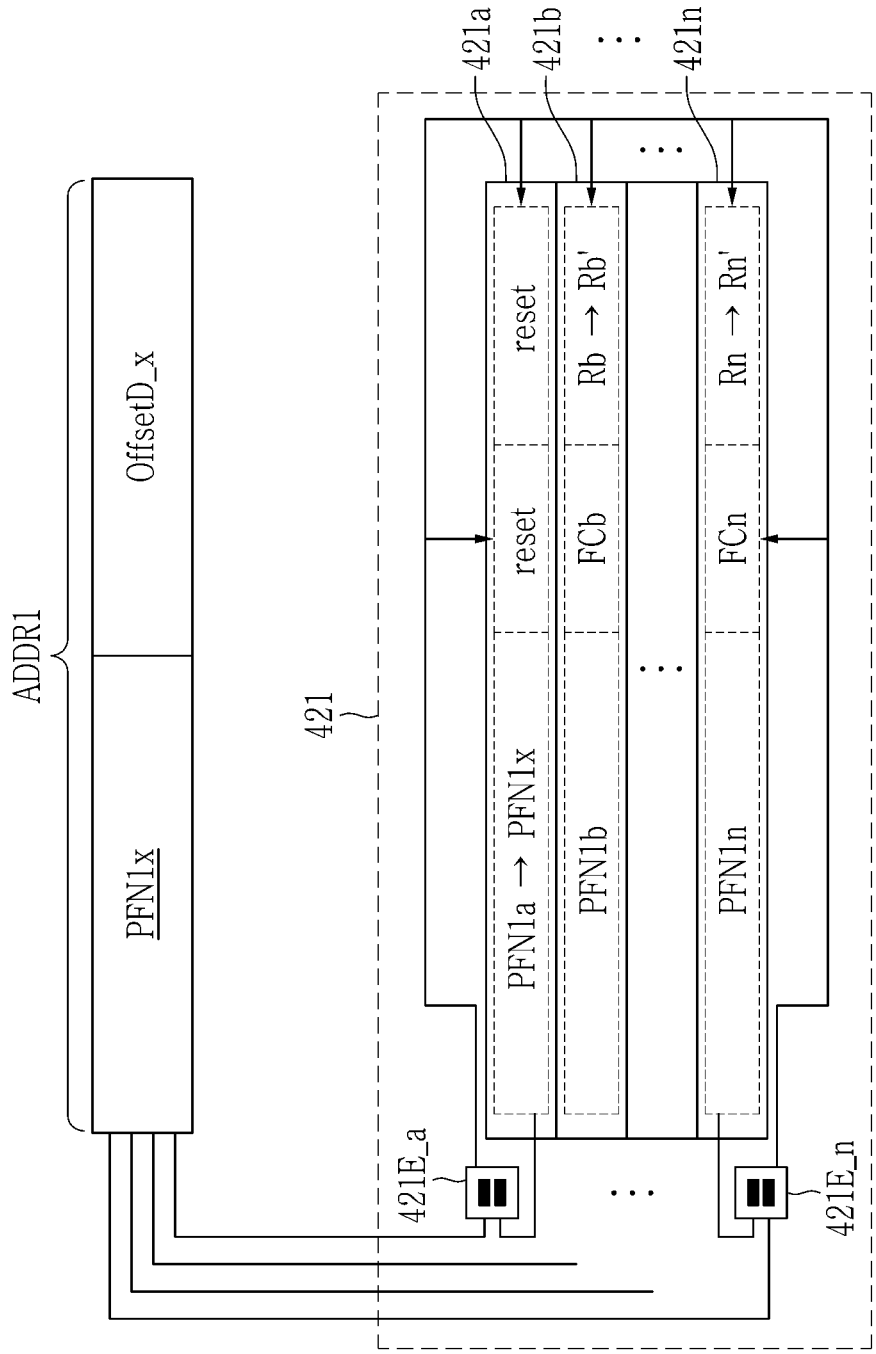

According to some embodiments, the hot page logic 420 may collect the meta data MD without a separate input after the reset (S110), but is not limited thereto, and the hot page logic 420 may be input with separate commands and/or signals related to collecting the meta data MD. Referring to FIGS. 9 and 10 in relation to the collection of the meta data MD by the hot page logic 420.

FIGS. 9 to 10 are diagrams for describing operations of a hot page logic according to some embodiments.

FIG. 9 is a diagram for describing operations of collecting meta data when a hit occurs between an input address signal and a previously input page frame list. FIG. 10 is a diagram for describing operations of collecting meta data when a miss occurs in between an input address signal and a previously input page frame list.

Referring additionally to FIG. 9, the address table circuit 421 may store the page frame list PFN_L including the first_a to first_n-th page frame numbers PFN1a-PFN1n and meta data MD corresponding thereto. The address table circuit 421 may receive the first_a page frame number PFN1a, which is any one of the first_a to first_n-th page frame numbers PFN1a-PFN1n.

When the a-th comparison operator 421E_a determines that the first_a page frame number PFN1a stored in the a-th page frame circuit 421a and the input first_a page frame number PFN1a are the same, the a-th frequency data FCa may be corrected with a a-th adjustment frequency data FCa'. According to some embodiments, the value of the a-th adjustment frequency data FCa' may be more than the value of the a-th frequency data FCa, but is not limited thereto.

In addition, when the a-th comparison operator 421E_a determines that the first_a page frame number PFN1a stored in the a-th page frame circuit 421a and the input first_a page frame number PFN1a are the same, the a-th to n-th recency data Ra-Rn may be modified into a to n-th adjustment recency data Ra'-Rn'. According to some embodiments, the value of the a-th adjustment frequency data Ra' may be the most among the values of the a-th to n-th adjustment recency data Ra'-Rn', but is not limited thereto.

Referring additionally to FIG. 10, the address table circuit 421 may collect the meta data MD using an LRU replacement policy. The address table circuit 421 may receive a first_x page frame number PFN1x that are not included in the previously input first_a to first_n-th page frame numbers PFN1a-PFN1n.

When data is stored in all the page frame circuits 421a-421n of the address table circuit 421 and the a-th recency data Ra has the lowest value among the a-th to n-th recency data Ra-Rn, the address table circuit 421 may reset the first_a page frame number PFN1a in the a-th page frame circuit 421a, the a-th frequency data FCa as the meta data MD corresponding thereto, and the a-th recency data Ra, and may store the first_x page frame number PFN1x in the a-th page frame circuit 421a.

Further, the address table circuit 421 may modify the remaining b-th to n-th recency data Rb-Rn into b-th to n-th adjustment recency data Rb'-Rn'. According to some embodiments, the value of the reset recency data may be more than the b-th to n-th adjustment recency data Rb'-Rn', but is not limited thereto.

Although FIG. 10 shows that data is stored in all page frame circuits 421a-421n of the address table circuit 421, if there is an empty page frame circuit in the address table circuit 421, the first_x page frame number PFN1x and the corresponding meta data MD may be written without a reset operation for the page frame circuits 421a-421n.

Next, the PMU 110 measures the first data bandwidth BW1 for the first data DQ1 and the second data bandwidth BW2 for the second data DQ2 (S130). Thereafter, the PMU 110 may repeatedly measure the first data bandwidth BW1 and the second data bandwidth BW2 every epoch period. According to some embodiments, the epoch period may be predetermined, but is not limited thereto.

The PMU 110 may provide the bandwidth data BW_data including the measured first data bandwidth BW1 and the measured second data bandwidth BW2 to the OS (S131).

The OS determines whether the ratio between the first data bandwidth BW1 and the second data bandwidth BW2 satisfies a predetermined bandwidth ratio so as to determine whether to perform the page migration operation (S140).

When the measured ratio of the first data bandwidth BW1 and the second data bandwidth BW2 matches the predetermined bandwidth ratio, the OS may not perform the migration operation. The predetermined bandwidth ratio may be input through an external interface, but is not limited thereto, and may be loaded in a state stored in memory.

If the ratio between the measured first data bandwidth BW1 and the second data bandwidth BW2 and the predetermined bandwidth ratio are different, the OS adjusts the coefficient by performing a migration operation (S150).

The OS may adjust the frequency weight value factor Wf, the recency weight value factor Wr, and the threshold value TH.

According to some embodiments, the OS may repeatedly perform steps S140 and S150 based on Q-learning. The Q-learning is one of the reinforcement learning techniques for learning without a model. The Q-learning may be used to find the optimal policy for a given finite Markov decision process. The Q-learning may learn an optimal policy by learning a Q-function, which is a function that predicts the expected value of utility for performing a given action in a given state. The OS of the present disclosure may learn an optimal policy by varying at least one of the first data bandwidth BW1 and the second data bandwidth BW2 of the bandwidth data BW_data, by varying at least one of the frequency weight value factor Wf, the recency weight value factor Wr, and the threshold TH in the state of having the bandwidth data BW_data.

The OS may repeatedly perform and learn the bandwidth ratio measurement and migration operation through the Q-learning, and adjust the control of data access in the electronic system 1a to provide the high-capacity heterogeneous memory system 30 capable of high-speed processing.

The hot page logic 420 performs calculation operations to create the hot page list HP_L (S160).

The OS may provide a migration command MI_CMD to the hot page logic 420 (S161). The OS may provide the adjusted frequency weight value factor Wf, the recency weight value factor Wr, and the threshold value TH to the hot page logic 420 along with the migration command MI_CMD.

In addition, the meta data MD collection operation of the hot page logic 420 may be terminated with the transfer of the migration command MI_CMD, but is not limited thereto. According to some embodiments, the OS may provide a separate collection termination signal to the hot page logic 420.

The OS may adjust and set the meta data collection period through transfer of the migration command MI_CMD. According to some embodiments, the meta data collection period may repeatedly have a certain period, but is not limited thereto.

The hot page logic 420 may perform calculation on the frequency weight value coefficient Wf, the recency weight value factor Wr, the threshold value TH, the frequency data FC, and the recency data R (S162). In this regard, it will be described together with reference to FIGS. 11 and 12.

Figure 11:
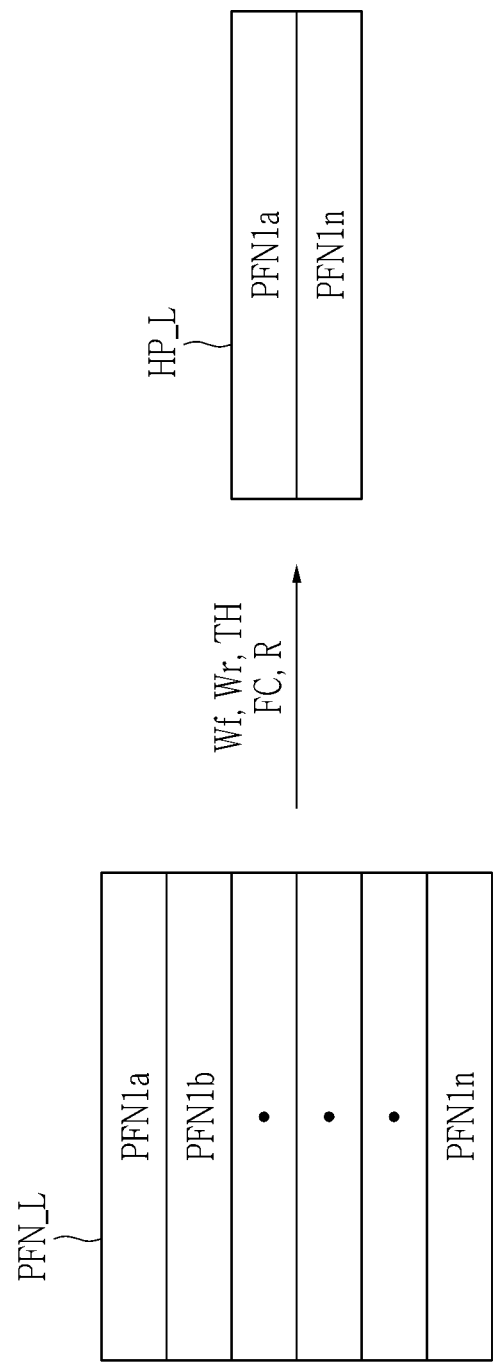
FIGS. 11 and 12 are diagrams for describing operations of an electronic system according to some embodiments.
Figure 12:
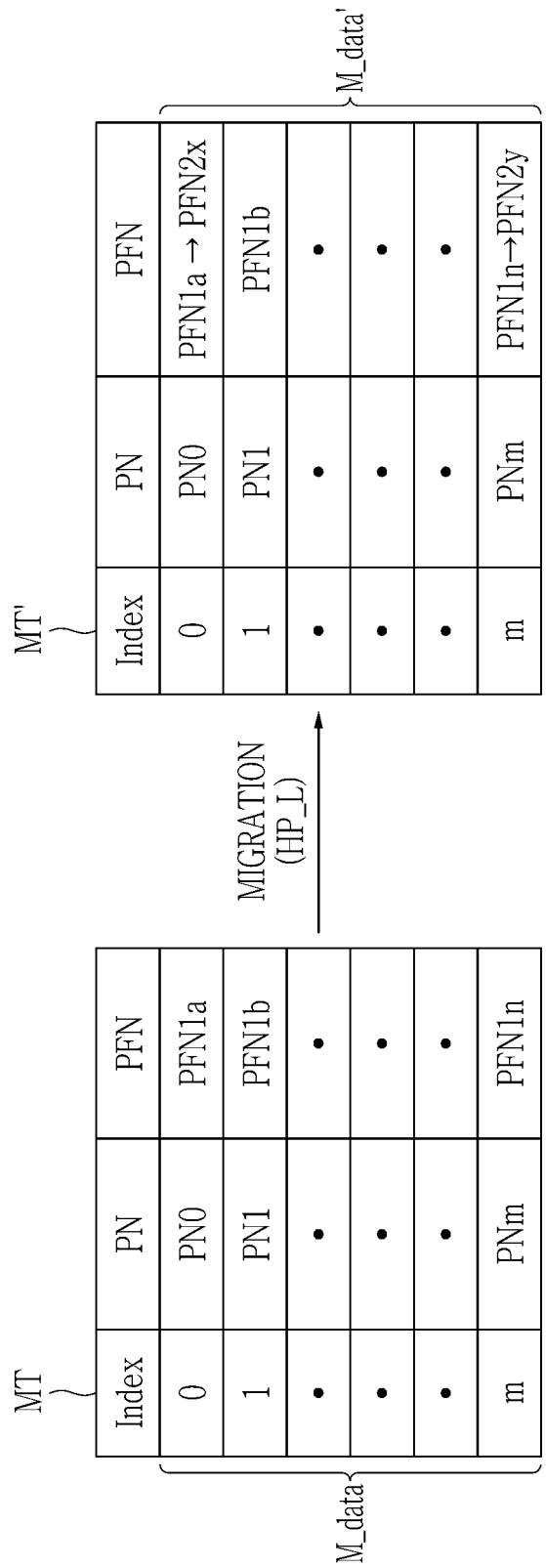

FIGS. 11 and 12 are diagrams for describing operations of an electronic system according to some embodiments.

Referring additionally to FIG. 11, the frequency data FC may be any one of the a-th to n-th frequency data FCa-FCn for the first_a to first_n-th page frame numbers PFN1a-PFN1n, and the recency data R may be any one of the a-th to n-th recency data Ra-Rn for the first_a to first_n-th page frame numbers PFN1a-PFN1n.

The hot page logic 420 may perform calculation operations for the frequency weight value coefficient Wf, the recency weight value coefficient Wr, the threshold value TH, the frequency data FC, and the recency data R through the first multiplier 424, the second multiplier 425, and the adder 426. The hot page logic 420 may create the hot page list HP_L for the page frame list PFN_L based on the result of the calculation operation through the hot page detector 423, and transfer the hot page list HP_L to the OS (S163).

In the example shown in FIG. 11, the hot page detector 423 may perform calculation on the first_a to first_n-th page frame numbers PFN1a-PFN1n, and determine the first_a page frame number PFN1a and the first_n-th page frame number PFN1a as hot pages. The hot page detector 423 may create and output the hot page list HP_L including the first_a page frame number PFN1a and the first_n-th page frame number PFN1n determined as hot pages.

Referring additionally to FIG. 12, the OS performs a page migration operation by modifying the mapping table MT based on the hot page list HP_L (S170).

As shown in FIG. 12, the mapping table MT may include map data M_Data indicating that 0-th to m-th pages PN1-PNm correspond to the first_a to first_n-th page frame numbers PFN1a-PFN1n. The OS may perform a page migration operation based on the received hot page list HP_L to modify the mapping table MT into an adjusted mapping table MT'.

For example, based on the hot page list HP_L of FIG. 11, the OS may perform migration for the first_a page frame number PFN1a to a second_x page frame number PFN2x corresponding to the second address signal ADDR2 of the second memory system 50, and perform migration for the first_n page frame number PFN1n to a second_y page frame number PFN2y corresponding to the second address signal ADDR2 of the second memory system 50, thereby modifying the map data M_Data to an adjusted map data M_Data'.

The adjusted map data M_Data' may include a correspondence between a 0-th page PN0 and the second_x page frame number PFN2x and a correspondence between a m-th page PNm and the second_y page frame number PFN2y. As the modification for the map data M_Data of the OS, the mapping table MT may be modified into the adjusted mapping table MT'.

Thereafter, the electronic system 1a may repeatedly perform operations S110 to S170. The ratio of the bandwidth data BW_data may be adjusted through repetition. According to some embodiments, the measurement operation of the PMU 110 in step S130 may be repeated at the same epoch period, and the meta data collection period between steps S120 and S161 may be constant and predetermined. However, the technical spirit of the present disclosure is not limited thereto.

The hot page logic 420 collects the frequency data FC and the recency data R, which are meta data MD, without performing a separate sample operation on the first address signal ADDR1 during the meta data collection period, and determines a hot page based on the collected data, thereby improving the reliability of the hot page determination operation in the electronic system 1a.

The hot page logic 420 may reduce overhead of the OS by performing calculation for collecting meta data MD and determining a hot page with a separate hardware configuration.

Figure 13:
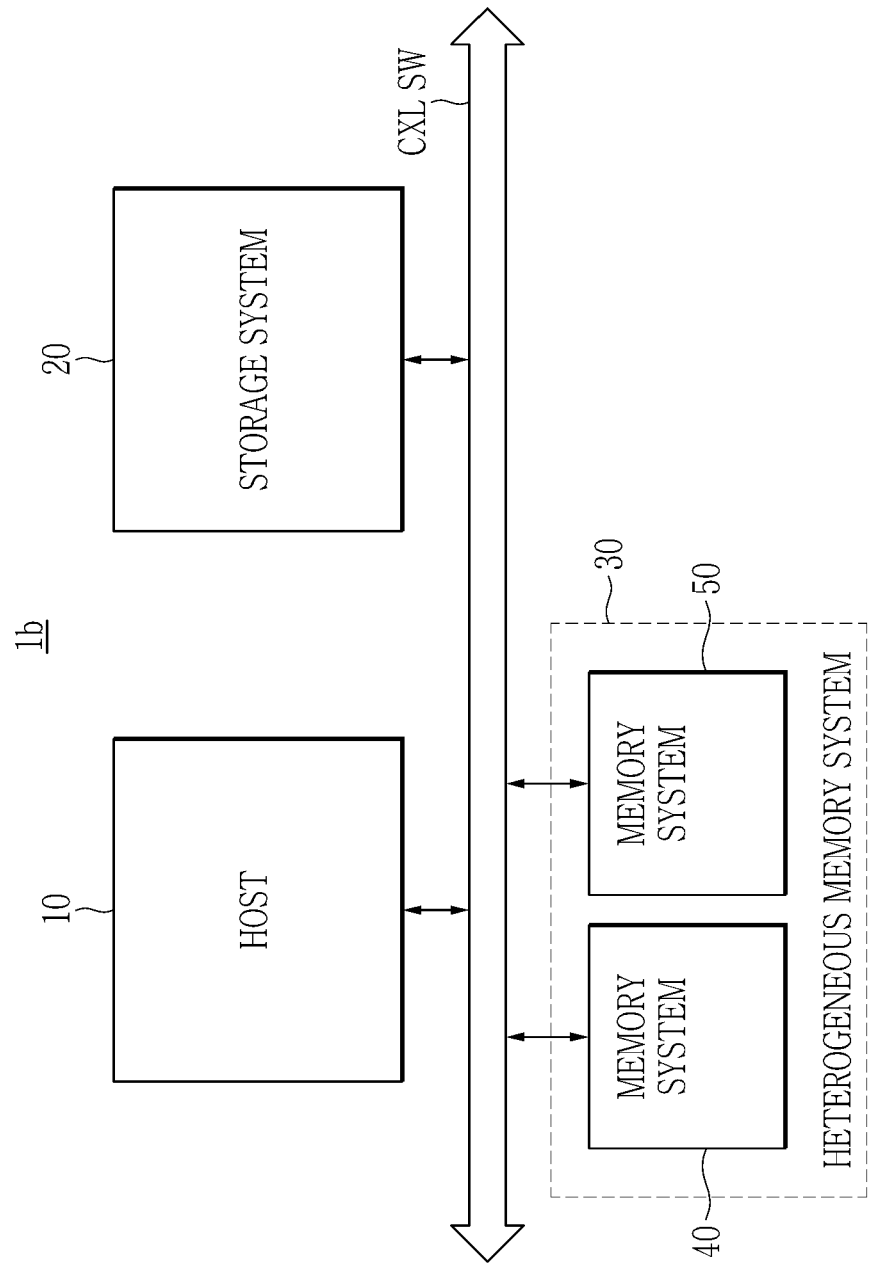
FIG. 13 is a block diagram illustrating an electronic system according to some embodiments.

FIG. 13 is a block diagram illustrating an electronic system according to some embodiments. Referring to FIGS. 1 and 13 together, an electronic system 1b of FIG. 13 may correspond to the electronic system 1a of FIGS. 1 to 12. For convenience of description, detailed descriptions of overlapping constituent elements will be omitted, and the electronic system 1b will be described based on differences between the electronic system 1b and the electronic system 1a.

The electronic system 1b may further include a CXL switch CXL_SW. The CXL switch CXL_SW may be a constituent element included in the CXL interface. In some embodiments, the compute express link interface (CXL interface) may refer to a low-latency time and high-bandwidth link that support coherency, memory access, and dynamic protocol muxing of input/output protocol (IO protocol) to enable various connections between accelerators, memory devices, and/or various electronic devices.

The CXL switch CXL_SW may be configured to mediate communication between the host device 10, the storage system 20, and the heterogeneous memory system 30. For example, when the host device 10 and the storage system 20 communicate with each other, the CXL switch CXL_SW may be configured to transmit information such as a request, data, response, or signal from the host device 10 or the storage system 20 to the storage system 20 or the host device 10. When the host device 10 and the heterogeneous memory system 30 communicate with each other, the CXL switch CXL_SW may be configured to transmit information such as a request, data, response, or signal from the host device 10 or the heterogeneous memory system 30 to the heterogeneous memory system 30 or the host device 10. When the storage system 20 and the heterogeneous memory system 30 communicate with each other, the CXL switch CXL_SW may be configured to transmit information such as request, data, response, or signal from the storage system 20 and the heterogeneous memory system 30 to the heterogeneous memory system 30 or the storage system 20.

Although not shown, the host device 10 may include a CXL host interface circuit. The CXL host interface circuit may communicate with the CXL storage system 20 or the heterogeneous memory system 30 through the CXL switch CXL_SW.

In addition, the first memory system 40 and the second memory system 50 in the heterogeneous memory system 30 may also be connected to the CXL switch CXL_SW. When the first memory system 40 and the second memory system 50 communicate with each other, the CXL switch CXL_SW may be configured to transmit information such as request, data, response, or signal from the first memory system 40 and the second memory system 50 to the second memory system 50 or the second memory system 50.

Figure 14:
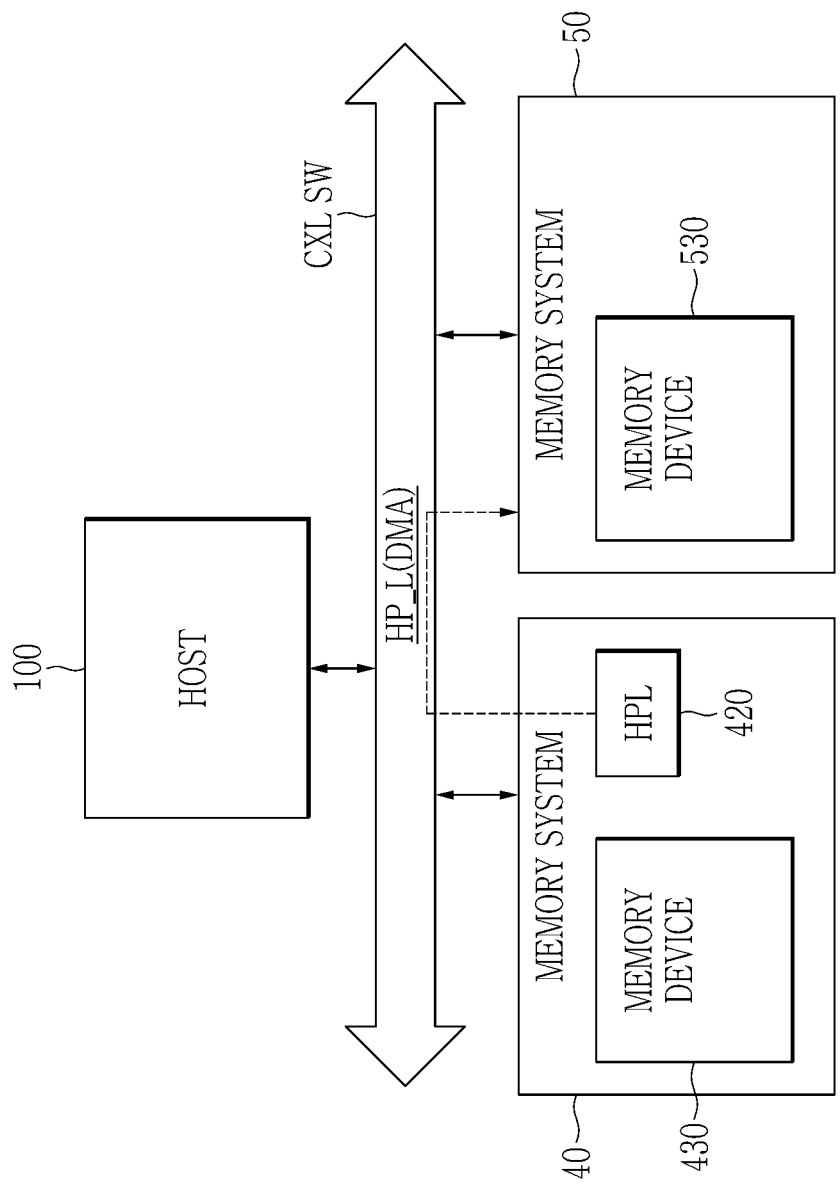
FIG. 14 is a diagram for describing operations of an electronic system according to some embodiments.

FIG. 14 is a diagram for describing an operation of an electronic system according to some embodiments.

Referring to FIG. 14, the first memory system 40 and the second memory system 50 may exchange the hot page list HP_L based on a peer-to-peer (P2P) method.

The hot page logic 420 included in the first memory system 40 may transmit the hot page list HP_L to the second memory system 50 without interference or control of the host device 10. That is, the hot page list HP_L may be transmitted from the first memory system 40 to the second memory system 50 based on a P2P method.

The above-mentioned methods of transmitting the hot page list HP_L from the first memory system 40 to the second memory system 50 are merely examples, and the scope of the present disclosure is not limited thereto. It will be understood that transmission of the hot page list HP_L from the first memory system 40 to the second memory system 50 may be implemented in various ways through a CXL interface or a CXL switch.

Figure 15:
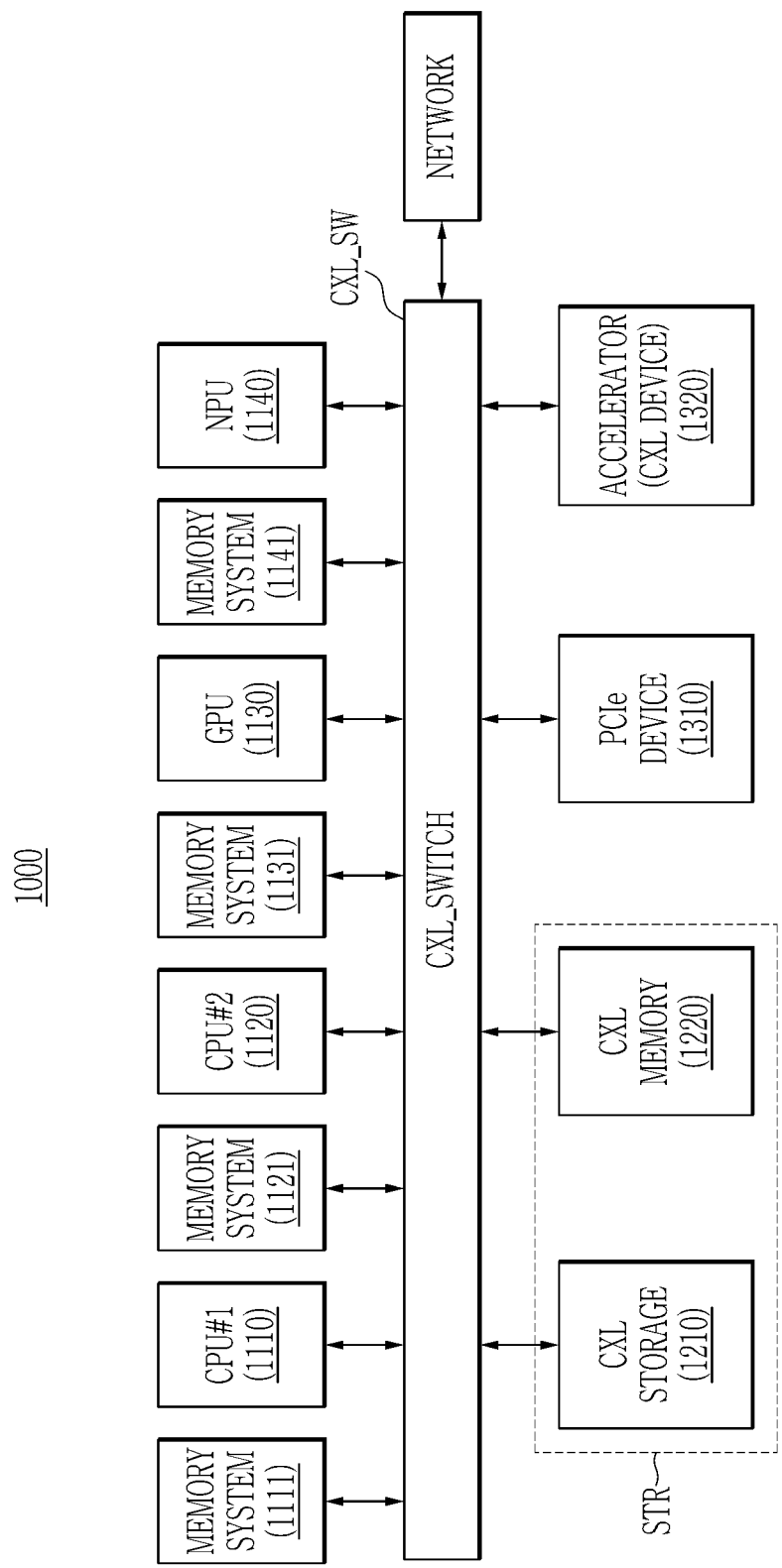
FIG. 15 is a block diagram illustrating a computing system to which an electronic system according to some embodiments is applied.

FIG. 15 is a block diagram illustrating a computing system to which an electronic system according to some embodiments is applied. Hereinafter, detailed descriptions of overlapping constituent elements are omitted for better understanding and case of description. A computing system 1000 may include a first CPU 1110, a second CPU 1120, a GPU 1130, an NPU 1140, a CXL switch CXL_SW, a CXL storage 1210, a CXL memory 1220, a PCIe device 1310, an accelerator (CXL device) 1320, and first to fourth memory systems 1111, 1121, 1131, and 1141.

The first CPU 1110, the second CPU 1120, the GPU 1130, the NPU 1140, the CXL storage 1210, the first to fourth memory systems 1111, 1121, 1131, and 1141, the CXL memory 1220, the PCIe device 1310 and the accelerator (CXL device) 1320 may be commonly connected to the CXL switch CXL_SW, and each may communicate with each other through the CXL switch CXL_SW.

The CXL switch CXL_SW may be connected to the PCIe device 1310 or the accelerator 1320 configured to support various functions. The PCIe device 1310 or the accelerator 1320 may communicate with each of the first CPU 1110, the second CPU 1120, the GPU 1130, and the NPU 1140, or may access a storage space STR including the CXL storage 1210 and the CXL memory 1220 through the CXL switch CXL_SW.

In some embodiments, each of the first CPU 1110, the second CPU 1120, the GPU 1130, and the NPU 1140 may be the host device 10 described with reference to FIGS. 1 to 14. In the drawings, each of the first to fourth memory systems 1111, 1121, 1131, 1141 is illustrated as being connected to the first CPU 1110, the second CPU 1120, the GPU 1130, and the NPU 1140 through the CXL switch CXL_SW. However, the first CPU 1110, the second CPU 1120, the GPU 1130, and the NPU 1140 and each of the first through fourth memory systems 1111, 1121, 1131, and 1141 may be individually connected without limited thereto.

The CXL memory 1220 may operate as a memory expander for a host device. The CXL memory 1220 may be the first memory system 40 referred to by describing FIGS. 1 to 14, and may include the hot page logic 420 of FIGS. 1 to 14.

Each of the first to fourth memory systems 1111, 1121, 1131, and 1141 may be the second memory system 50 referred to in the description of FIGS. 1 to 14. Each of the first to fourth memory systems 1111, 1121, 1131, and 1141 may configure the heterogeneous memory system 30 referred to in the description of FIGS. 1 to 14 together with the CXL memory 1220. Heterogeneous memory systems enable high-speed processing of high-capacity data by performing page migration between memory systems.

Figure 16:
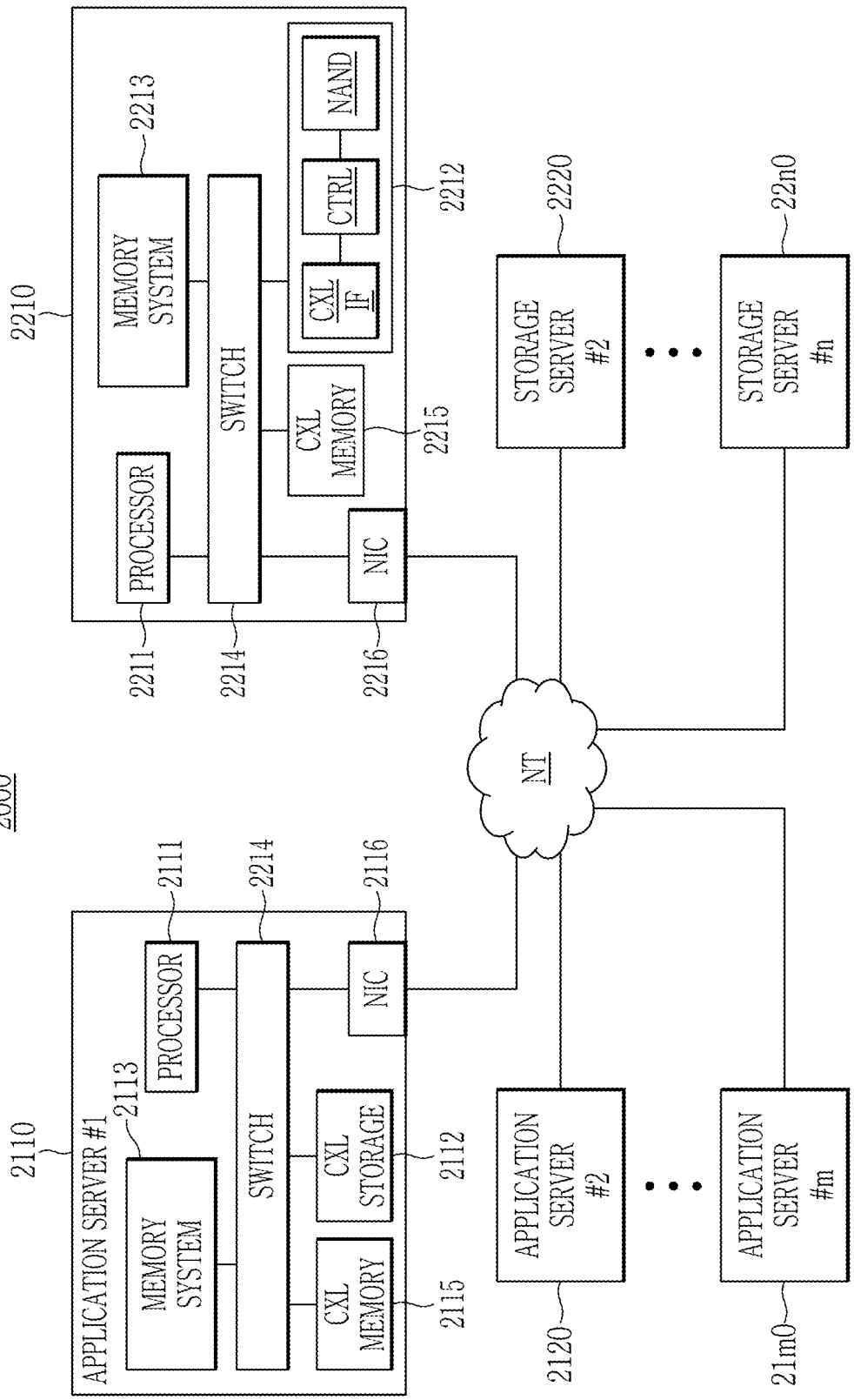
FIG. 16 is a block diagram illustrating a data center to which an electronic system according to some embodiments is applied.

FIG. 16 is a block diagram illustrating a data center to which an electronic system according to some embodiments is applied.

Referring to FIG. 16, a data center 2000 is a facility that stores various data and provides services, and may also be referred to as a data storage center. The data center 2000 may be a system for operating a search engine and a database, and may be a computing system used by companies such as banks or government agencies. The data center 2000 may include application servers 2110 to 21m0 and storage servers 2210 to 22m0. The number of application servers and the number of storage servers may be variously selected according to various embodiments, and the number of application servers and the number of storage servers may be different from each other.

Hereinafter, the configuration of the first storage server 2210 will be mainly described. Each of the application servers 2110 to 21m0 and the storage servers 2210 to 22m0 may have a structure similar to each other, and the application servers 2110 to 21m0 and the storage servers 2210 to 22m0 may communicate with each other through network (NT).

The first storage server 2210 may include a processor 2211, a CXL storage system 2212, a memory system 2213, a switch 2214, a CXL memory 2215, and a network interface card (NIC) 2216. The processor 2211 may control the overall operation of the first storage server 2210, and access the memory system 2213 to execute instructions loaded in the memory system 2213 or process data. The memory system 2213 may include at least one of double data rate synchronous DRAM (DDR SDRAM), high bandwidth memory (HBM), hybrid memory cube (HMC), dual in-line memory module (DIMM), Optane DIMM, and/or non-volatile DIMM (NVMDIMM). The processor 2211 and the memory system 2213 may be directly connected, but are not limited thereto. Further, the number of processors 2211 and memory systems 2213 included in one storage server 2210 may be variously selected.

In some embodiments, the processor 2211 and the memory system 2213 may provide a processor-memory pair. In some embodiments, the number of processors 2211 and memory systems 2213 may be different from each other. The processor 2211 may include a single core processor or a multi-core processor. In addition, the memory system 2213 may reduce the overhead of the OS in controlling data access in the tiered memory system by arranging the hot page logic 420 described above with reference to FIGS. 1 to 12 in hardware. The above description of the storage server 2210 may be similarly applied to each of the application servers 2110 to 21m0.

The switch 2214 may be configured to mediate or route communication between various elements included in the first storage server 2210. In some embodiments, the switch 2214 may be the CXL switch CXL_SW described with reference to FIGS. 13 to 15. That is, the switch 2214 may be a switch implemented based on the CXL protocol.

The CXL memory 2215 may be connected to the switch 2214. In some embodiments, the CXL memory 2215 may be used as a memory expander for the processor 2211, and may be the first memory system 40 described with reference to FIGS. 1 to 14. The memory system 2213 may be the second memory system 50 described with reference to FIGS. 1 to 14, so that the CXL memory 2215 and the memory system 2213 may configure the heterogeneous memory system 30 described with reference to FIGS. 1 to 14. The CXL memory 2215 may reduce the overhead of an operating system in controlling data access in a tiered memory system by arranging the hot page logic 420 described above with reference to FIGS. 1 to 12 in hardware.

The CXL memory 2215 may be allocated as dedicated memory or buffer memory for the storage system 2212, as described with reference to FIG. 15.

The storage system 2212 may include a CXL interface circuit CXL_IF, a controller CTRL, and a NAND flash NAND. The storage system 2212 may store data or output stored data according to a request of the processor 2211. In some embodiments, the storage system 2212 may be the CXL storage described with reference to FIG. 15.

According to some embodiments, the application servers 2110 to 21m0 may not include the storage system 2112. The storage server 2210 may include at least one storage system 2212. The number of storage systems 2212 included in a storage server 2210 may be variously selected according to various embodiments.

The NIC 2216 may be connected to the CXL switch CXL_SW. The NIC 2216 may communicate with other storage servers 2220-22n0 or other application servers 2110-21m0 over the network NT.

In some embodiments, NIC 2216 may include a network interface card, network adapter, and the like. The NIC 2216 may be connected to the network NT by a wired interface, a wireless interface, a Bluetooth interface, an optical interface, or the like. The NIC 2216 may include an internal memory, a digital signal processor (DSP), a host bus interface, and may be connected to the processor 2211 and/or the switch 2214 through a host bus interface. In some embodiments, the NIC 2216 may be integrated with at least one of the processor 2211, the switch 2214, and the storage system 2212.

In some embodiments, the network NT may be implemented using fiber channel (FC) or ethernet. In this case, FC is a medium used for relatively high-speed data transmission, and an optical switch providing high performance/high availability may be used. Depending on the access method of the network NT, the storage servers may be provided as file storage, block storage, or object storage.

In some embodiments, network NT may be a storage-only network, such as a storage area network (SAN). For example, the SAN may be an FC-SAN using an FC network and is implemented according to FC protocol (FCP). As another example, the SAN may be an IP-SAN using a TCP/IP network and implemented according to the iSCSI (SCSI over TCP/IP or Internet SCSI) protocol. In some embodiments, network NT may be a general network such as a TCP/IP network. For example, the network NT may be implemented according to protocols such as FC over ethernet (FCoE), network attached storage (NAS), and NVMe over fabrics (NVMe-oF).

In some embodiments, at least one of the application servers 2110-21m0 may store data requested by a user or client to be stored in one of the storage servers 2210-22m0 through the network NT. At least one of the application servers 2110-21m0 may acquire data requested by a user or client to read from one of the storage servers 2210-22n0 through the network NT. For example, at least one of the application servers 2110-21m0 may be implemented as a web server or a database management system (DBMS).

In some embodiments, at least one of the application servers 2110-21m0 may access a memory system, a CXL memory, or a storage system included in another application server through the network NT, or may access memory systems, CXL memories, or storage systems included in the storage servers 2210-22n0 through the network NT. Accordingly, at least one of the application servers 2110-21m0 may perform various operations on data stored in other application servers and/or storage servers. For example, at least one of the application servers 2110-21m0 may execute an instruction for moving or copying data between other application servers and/or storage servers. In this case, data may be moved from the storage devices of the storage servers through the memory systems or CXL memories of the storage servers, or directly to the memory systems or CXL memories of the application servers. Data moving through the network may be encrypted data for security or privacy.

While some embodiments of the present disclosure have been described in detail, it is to be understood that the disclosure is not limited to the disclosed embodiments, but on the contrary, is intended to cover various modifications and equivalent arrangements included within the spirit and scope of the appended claims.

What is claimed is:

1. A memory system, comprising:
a memory device configured to receive data; and
a hot page logic configured to receive an address for the data, configured to determine that the address is for a hot page based on an input frequency and an input order of the address, and configured to create hot page information including the address that was determined as associated with the hot page such that a page migration operation of the data is performed,
wherein the hot page logic is configured to collect frequency data based on the input frequency of the address that was received during a first time period that is predetermined, and configured to collect recency data based on the input order of a page frame indicated by the address, and
wherein the hot page logic is configured to perform a calculation operation on the frequency data and the recency data, compare a result of the calculation operation with a threshold value, and determine the page frame indicated by the address as the hot page.

2. The memory system of claim 1,
wherein the hot page logic compares the result of the calculation operation with the threshold value based on an equation, $$TH < Wf \cdot FC + Wr \cdot R$$

wherein TH is the threshold value, Wf is a frequency weight value coefficient, FC is a value of the frequency data, Wr is a recency weight value coefficient, and R is a value of the recency data.

3. The memory system of claim 1,
wherein the hot page logic includes a special function register (SFR) that is configured to store a frequency weight value coefficient and a recency weight value coefficient used in the calculation operation, and the threshold value.

4. The memory system of claim 3,
wherein the SFR is configured to change and provide at least one of the frequency weight value coefficient, the recency weight value coefficient, or the threshold value after creating the hot page information.

5. The memory system of claim 3,
wherein data bandwidth of the memory device changes responsive to at least one of the frequency weight value coefficient, the recency weight value coefficient, or the threshold value stored in the SFR changing.

6. The memory system of claim 1,
wherein after the first time period, the hot page logic is configured to perform a reset operation on the frequency data and the recency data that were collected.

7. The memory system of claim 1,
wherein the address includes a first address and a second address,
wherein the frequency data includes a first frequency data for the first address and a second frequency data for the second address,
wherein the recency data includes a first recency data for the first address and a second recency data for the second address, and
wherein when the first address is input during the first time period, the hot page logic increases a value of the first frequency data.

8. The memory system of claim 1,
wherein the address includes a first address and a second address,
wherein the frequency data includes a first frequency data for the first address and a second frequency data for the second address,
wherein the recency data includes a first recency data for the first address and a second recency data for the second address,
wherein a value of the first recency data is less than a value of the second recency data, and
wherein when a third address is input in addition to the first address and the second address during the first time period, the hot page logic resets the first frequency data and the first recency data.

9. The memory system of claim 8,
wherein the hot page logic is configured to store a third frequency data and a third recency data corresponding to the third address, and
wherein a value of the third recency data that is stored is greater than a value of the first recency data.

10. An electronic system, comprising:
a processor configured to output data and an address of the data;
a first memory system including a first memory device configured to receive the data and a hot page logic configured to receive the address and configured to output hot page information based on an input frequency and an input order of the address; and
a second memory system including a second memory device different from the first memory device,
wherein a page migration operation for the data is performed based on the hot page information, and
wherein the processor comprises a performance management unit configured to measure a first data bandwidth of the data that is input to the first memory device and configured to measure a second data bandwidth of the data that is input to the second memory device.

11. The electronic system of claim 10,
wherein a latency time of the first memory system is longer than a latency time of the second memory system.

12. The electronic system of claim 10,
wherein if a ratio of the first data bandwidth and the second data bandwidth is different from a predetermined bandwidth ratio, the page migration operation is performed in the second memory system.

13. The electronic system of claim 10, further comprising:
a CXL switch that is configured to enable the first memory system and the second memory system to communicate with each other, wherein the first memory system is configured to provide the hot page information to the second memory system through the CXL switch.

14. A method of operating an electronic system, comprising:
- collecting frequency data and recency data of an address in a first memory system based on an input frequency and an input order of the address for a first data that is input to the first memory system;
- measuring a first data bandwidth of the first data and a second data bandwidth of a second data that is input to a second memory system different from the first memory system;
- performing a calculation operation on the frequency data and the recency data in response to a ratio of the first data bandwidth and the second data bandwidth;
- creating hot page information indicating whether the address is a hot page based on the calculation operation; and
- migrating a page for the first data based on the hot page information.

15. The method of operating the electronic system of claim 14,
- wherein if the ratio of the first data bandwidth and the second data bandwidth is different from a predetermined bandwidth ratio, performing the calculation operation on the frequency data and the recency data.

16. The method of operating the electronic system of claim 15, further comprising:
- providing a frequency weight value coefficient and a recency weight value coefficient used in the calculation operation for the frequency data and the recency data, and a threshold value corresponding to a result of the calculation operation, based on the ratio of the first data bandwidth and the second data bandwidth.

17. The method of operating the electronic system of claim 14,
- wherein the creating of the hot page information comprises determining whether the address is associated with a hot page by comparing a result of the calculation operation with a threshold value.

* * * * *